United States Patent [19]

Andersson

[11] Patent Number: 5,596,612
[45] Date of Patent: Jan. 21, 1997

[54] TESTING ARRANGEMENT FOR MATERIALS TESTING, PARTICULARLY IN A PRESSURIZED-WATER REACTOR

[75] Inventor: Bjorn H. Andersson, Akersberga, Sweden

[73] Assignee: ABB Teknishka Rontgencentralen AB, Taby, Sweden

[21] Appl. No.: 238,496

[22] Filed: May 5, 1994

[30] Foreign Application Priority Data

Jun. 16, 1993 [SE] Sweden .................................. 9302087

[51] Int. Cl.⁶ .................................................. G21C 17/00
[52] U.S. Cl. .......................... 376/245; 376/252; 376/255
[58] Field of Search .................................. 376/245, 252, 376/255, 451, 449; 73/850, 842, 827, 570, 618, 622, 637

[56] References Cited

U.S. PATENT DOCUMENTS

| | | | |
|---|---|---|---|
| 4,116,766 | 9/1978 | Poindexter et al. | 376/203 |
| 4,311,556 | 1/1982 | Iwamoto et al. | 376/249 |
| 4,368,644 | 1/1983 | Wentzell et al. | 73/634 |
| 4,452,753 | 6/1984 | Wentzell et al. | 376/249 |
| 4,548,785 | 10/1986 | Richardson et al. | 376/249 |
| 4,628,207 | 12/1986 | Elfert et al. | 250/461.1 |
| 4,672,852 | 6/1987 | Gugel et al. | 73/622 |
| 4,883,124 | 12/1989 | Doughty | 376/260 |
| 4,957,694 | 9/1990 | Doughty | 376/310 |
| 5,118,464 | 6/1992 | Richardson et al. | 376/252 |
| 5,272,734 | 12/1993 | Clark et al | 376/260 |
| 5,323,429 | 6/1994 | Roarty et al. | 376/269 |
| 5,377,237 | 12/1994 | Richardson et al. | 376/252 |

FOREIGN PATENT DOCUMENTS

| | | |
|---|---|---|
| 0558371 | 9/1993 | European Pat. Off. . |
| 4215700 | 3/1994 | Germany . |

Primary Examiner—Donald P. Walsh
Assistant Examiner—Meena Chelliah
Attorney, Agent, or Firm—Young & Thompson

[57] ABSTRACT

A testing arrangement (14) and a method for materials testing at lead-throughs in a cap of a pressurized-water reactor, comprising a flexible sword (85) which at one end is equipped with a probe. Since the lead-throughs consists of a first tube passing the cap and welded to it, and a second tube inserted in the first tube, the weld joint has to be inspected from below via a gap between the tubes. In order to do this by means of a manipulator, a pinching arrangement (32) is arranged, which by pressing the inner tube towards one side widens the gap at the opposite side so that the sword can be inserted.

The pinching arrangement and the sword can then be displaced so that the sword and the widened gap moves around the inner tube, in order that the whole weld and its surrounding area can be inspected.

14 Claims, 8 Drawing Sheets

TESTING ARRANGEMENT FOR MATERIALS TESTING, PARTICULARLY IN A PRESSURIZED-WATER REACTOR

The present invention relates to a testing arrangement for materials testing at lead-throughs, especially for control rods, in pressurized-water reactors, to a probe sword suitable for the mentioned testing arrangement and to a method for materials testing at lead-throughs.

BACKGROUND OF THE INVENTION

At a pressurized-water reactor in a nuclear power plant there is a dome-shaped cap, with cap lead-throughs for a control rod mechanism, which is detachable attached to the cap. In the pressurized-water reactor there are also, in the cap or in the bottom, other lead-throughs for different instruments and vent pipes, which are connected to a kind of expansion vessel in the shape of an external pressure vessel with a water column.

A lead-through for a control rod consists of a tube passing through the cap, which tube is welded to the cap at its lower side. The lead-through ends at the inside of the cap with a downward inner conical opening having a cone angle of a few degrees, normally about 3 degrees. In the lead-through there is an essentially coaxial tubular sleeve, which ends with a downward essentially funnel-shaped end-piece. The lead-through sleeve is at a seat at the top sealingly joined to the projecting end of the tube. Between the tube and the sleeve, there is a gap with a nominal width of a few millimeters, normally about 3 mm. The purpose of the interior sleeve in a control rod lead-through is to make the longitudinal axis of the lead-through opening adjustable in relation to axial openings in means located inside the reactor. Therefore, the annular gap does not normally have equal width around the sleeve, due to the fact that it is used as a trimming allowance. In a cap, there is normally a total of about 60–75 control rod lead-throughs.

It has been found that leakage can arise at the control rod lead-throughs and that the leakage is due to cracks in the tubes of the lead-throughs, more particularly in the area close to the weld that connects a tube with the cap. If there is a crack in the tube above the weld, water can come up on the outside of the cap when the reactor is pressurized, while a crack below the weld is less dangerous since it does not give any external leakage. For the sake of security, it is necessary to test the material at the lead-throughs in order to detect cracks and determine their characteristics, such as size, position and orientation.

According to prior art, inspection of a reactor cap is carried out by dismounting the cap with the control rod mechanism from the reactor and place it on a biological concrete shield. The occurrence of defects at each lead-through is checked with the aid of a manipulator and by means of eddy current technology, whereby an eddy current probe is inserted into said gap between the sleeve and the tube. The eddy current probe is inserted into the gap by means of a thin metal sword, the probe being mounted at the top of the sword. The sword is bent past the end-piece of the sleeve and into the gap by means of reels. The sword can only be led forwards in the vertical direction because of the flexibility of the sword, and has to be pulled out of the gap before a displacement around the sleeve can be carried out. If defects are detected at one or more lead-throughs with said eddy current testing, the whole control rod mechanism and the lead-through sleeve with its end-piece are dismounted for the lead-through at issue. For the dismounting of the sleeve, the control rod mechanism with the associated sealing means at the top of the lead-through is disassemble, the end-piece is dismounted and the sleeve is pulled out of the tube. Thereafter, the characteristics, such as depth, length, position and orientation of each defect is determined by means of ultrasonic testing and with the aid of a manipulator placed above the cap, whereby the interest today is mostly focused on longitudinal cracks. Such a reactor inspection is expensive, time-consuming, entails the dismounting of the sleeves only for the ultrasonic testing of the insides of the tubes and entails manual handling which results in radiation exposure of the persons carrying out the inspection. Today, there is in a number of countries an acute need for testing pressurized water reactors with respect to cracks in the lead-throughs and a need for an appropriate testing equipment that eliminates unnecessary irradiation of people. Thus, it is desirable to be able to determine the characteristics of the defects without the disadvantageous dismounting of the sleeves.

It is a purpose of the present invention to provide a simplified and improved arrangement and method for testing a pressurized-water reactor. In particular, it should be possible to carry out both the detection of the cracks and the determination of their characteristics without the expensive and hazardous disassembling of the control rod mechanism and the lead-through sleeve, and thereby reduce the dose of radiation for people. In accordance with the preferred embodiment, it should be possible to carry out the entire testing by means of the manipulator which, according to prior art, is placed inside the dismounted cap.

The above mentioned and other purposes and advantages are obtained with a testing arrangement, a probe sword and a method as set out in the independent claims 1, 4 and 10, respectively.

The invention will now be described further by the explanation of an embodiment and in conjunction with the drawings. It is shown in.

TESTING ARRANGEMENT

Figure 1:
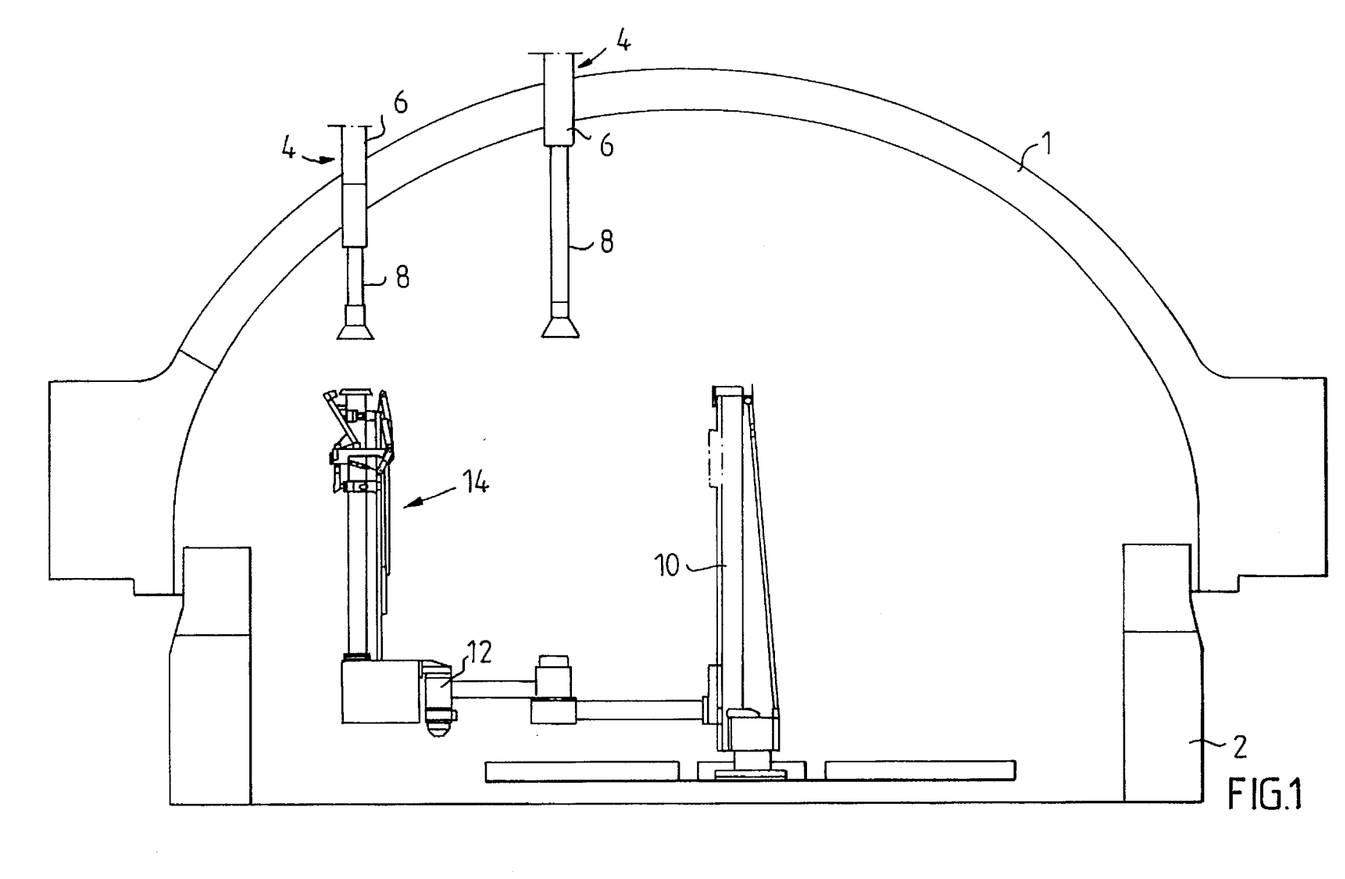
FIG. 1—an explanatory overview of a pressurized-water reactor cap with a testing arrangement according to the invention mounted at a manipulator placed under the cap, FIG. 2—an explanatory sketch of a lead-through, FIG. 3—a sketch of a weld joint unfolded in a plane, FIG. 4—a sketch of a preferred embodiment of a testing arrangement according to the invention, FIG. 5—an elevating motor arrangement in a lifting arrangement of a testing arrangement according to the invention, FIG. 5A—is a top plan view of FIG. 5, FIG. 6—a brake arrangement in a lifting arrangement of a testing arrangement according to the invention, FIG. 6A—is a top plan view of FIG. 6, FIG. 7—an explanatory sketch of the testing arrangement according to the invention with associated peripheral equipment, whereby the testing arrangement is docked to a cap lead-through, FIG. 8—the upper part of a testing arrangement according to the invention docked to a cap lead-through, FIG. 9a—an explanatory cross-section of a lead-through after a deflection of the sleeve, FIG. 9b—an explanatory longitudinal cut through a lead-through, with the essential shape of a probe sword in an inserted position drawn in the gap, FIG. 10—an explanatory sketch of a probe sword according to the invention, FIG. 11—an explanatory sketch of the upper part of a probe sword according to the invention, with five cross-sections of the sword, FIGS. 12a and 12b—a probe sword head with a cleaning probe according to the invention, FIGS. 13a and 13b—a probe sword head with an eddy current probe according to the invention, FIGS. 14a and 14b—a probe sword head with an ultrasonic probe according to the invention.

In FIG. 1 is shown a pressurized-water reactor cap 1 placed on a biological concrete shield 2. There are a number of lead-throughs 4 in the cap, normally about 60–75, only two thereof being drawn. A lead-through consists of a tube 6 passing through the cap 1, which tube is sealingly welded to the cap 1 at its lower surface. In the tube 6 there is a sleeve 8 which is essentially coaxial with the tube and which comprises an end-piece, which may be essentially funnel-shaped. The lower end surfaces of the sleeves 8 of all the control rod lead-throughs are normally situated in essentially the same plane, as is shown in FIG. 1. The parts of the sleeves 8 projecting out of each tube 6 have different lengths, depending on where in the cap dome the lead-through in question is situated.

A manipulator 10, with three degrees of freedom, for measurement and maintenance purposes, is placed under the cap dome. A testing arrangement 14 according to the invention is attached to the outermost joint 12 of the manipulator through a manipulator tool interface, in this case a dovetail. The testing arrangement 14 is dockable to an end-piece of the cap lead-through, and is docked by means of the manipulator 10 for the insertion of a probe sword, comprised in the testing arrangement 14, into a gap of the lead-through. It is shown in FIG. 1 how the testing arrangement by means of the manipulator 10 is positioned at a cap lead-through 4 before the docking. The positions of the lead-throughs have been determined beforehand in manipulator coordinates by means of a camera, and the positioning of the testing arrangement at a selected lead-through is carried out by utilizing the already present manipulator control system. For the mounting of the inventive testing arrangement at the manipulator, the manipulator end joint is brought to shut-table opening in the concrete shield, whereupon an operator, through the opening, leans or steps into the radioactive environment and carries out the mounting. In a further developed embodiment of the invention, a foldable arm is anticipated, which at least should allow the possibility to project the testing arrangement through the opening for e.g. exchange of the probe sword without the operator having to lean in under the cap dome.

Figures 2, 3:
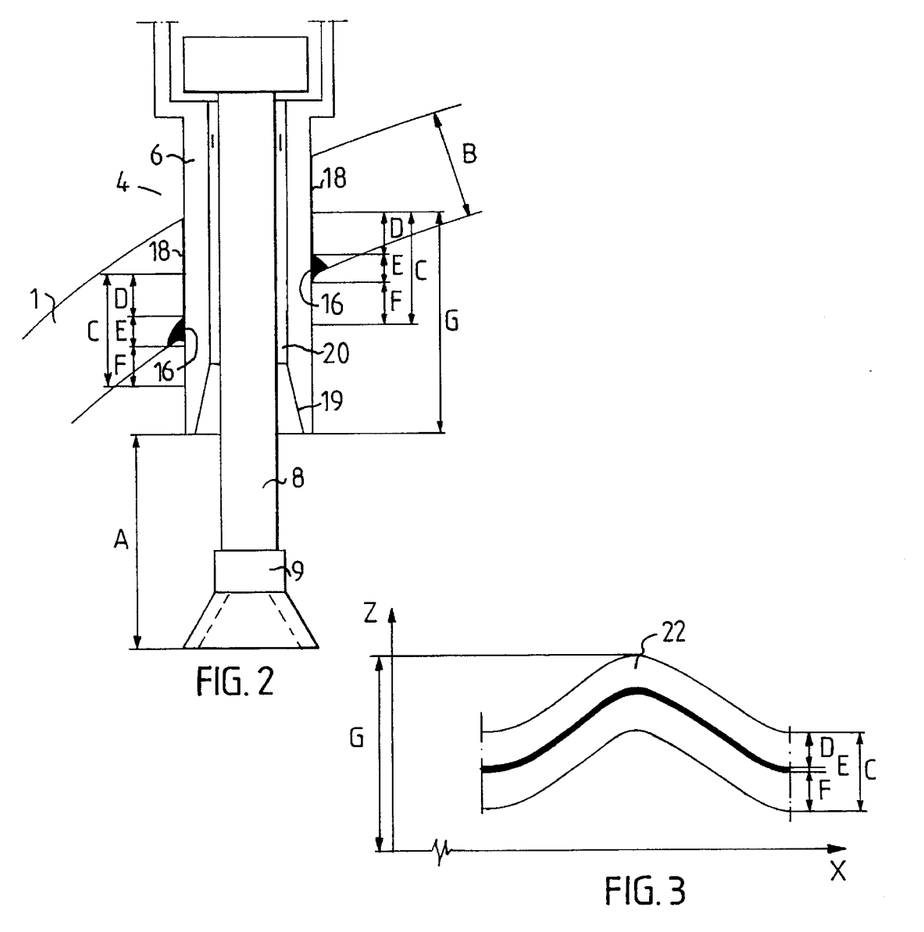

FIG. 2 shows a cut away cap lead-through 4, whereby the thickness B of the cap 1 normally is about 200–250 mm. The tube 6 passing the cap 1 is sealingly fastened to the cap by virtue of a pipe weld 16 running around the tube at the lower side of the cap. Between the tube 6 and the cap 1 there is above the weld a narrow first gap 18, hereinafter called a tube gap. The tube 6 has normally an outside diameter of about 100 mm and an inside diameter of about 70 mm. The lower part of the tube 6 has an inside cone-shaped ending 19, which for convenience hereinafter is called a tube cone. The tube cone 19 has a cone angle which is typically a few degrees, e.g. 3°.

In the tube 6 there is a sleeve 8 which normally has an outside diameter of about 64 mm, comprising an end-piece 9 which in this example is funnel-shaped and which hereinafter also is called a sleeve funnel. The sleeve 8 is (not shown) at its upper end sealingly joined to the end of the tube which projects on the upper side of the cap 1. When the control rods are lifted, it is possible to elevate the sleeve to a pivotable position. Between the sleeve 8 and the tube 6, there is a second gap 20, hereinafter also called sleeve gap, with a nominal gap width of normally about 3 mm. At the upper part of the lead-through there is in the sleeve gap, means to hold the sleeve in a selected position, which can be changed by elevating the sleeve. The distance A between the lower end surface of the sleeve 8 and the lower end surface of the tube 6 varies, depending on the position of the lead-through 4 in the dome-shaped cap 1 and due to the fact that the sleeves 8 are arranged in order that the lower end surfaces of all the sleeves 8 be located in essentially the same plane.

Cracks can, as has been mentioned, occur in the tube 6 close to the tube weld 16. When there are cracks in the area above the weld, fluid pressurized in the reactor may come out in the tube gap 18 and therethrough come up on the top of the cap 1. When there are cracks in the area below the tube weld 16, there is no external leakage, but also these cracks shall be detected. In the figure, a testing area C is indicated in the axial direction overlapping and around the tube weld 16. The area C comprises an area D above the tube weld 16, an area E overlapping the entire tube weld 16 and an area F below the tube weld 16. Today there is required a testing of the material in an area extending over the weld and covering an area D of about 50 mm above the weld and an area F of about 50 mm below the weld.

Materials testing over the described area is executed according to the invention by inserting a probe sword into the sleeve gap 20 and by rotating it along the gap around the axis of symmetry of the lead-through. The probe sword is then maneuvered in a movement that follows the tube weld 16 and its associated testing area. Since the tube weld 16 follows the intersection between the dome-shaped inner surface of the cap and the tube-shaped outer surface of the tube 6, the testing area unfolded in a plane describes an essentially sinus-shaped stripe 22 according to FIG. 3. In FIG. 3 the stripe widths of the testing area have the same designations as in FIG. 2, whereby the zero point of said axis is assumed to be situated at the lower end surface of the tube. When a probe sword rotates along the testing area in the sleeve gap 20, it should thus cover the whole width C and follow the stripe 22, and should therefore in the vertical direction have a length of stroke, taken from the end surface of the tube 6, that at the periphery of the cap normally may be about 280 mm. The length of stroke is indicated with a G in FIGS. 2 and 3. To assure a complete scanning of the testing area, the probe sword is rotated more than 360° around the sleeve 8, normally about 400°.

Figures 4, 8:
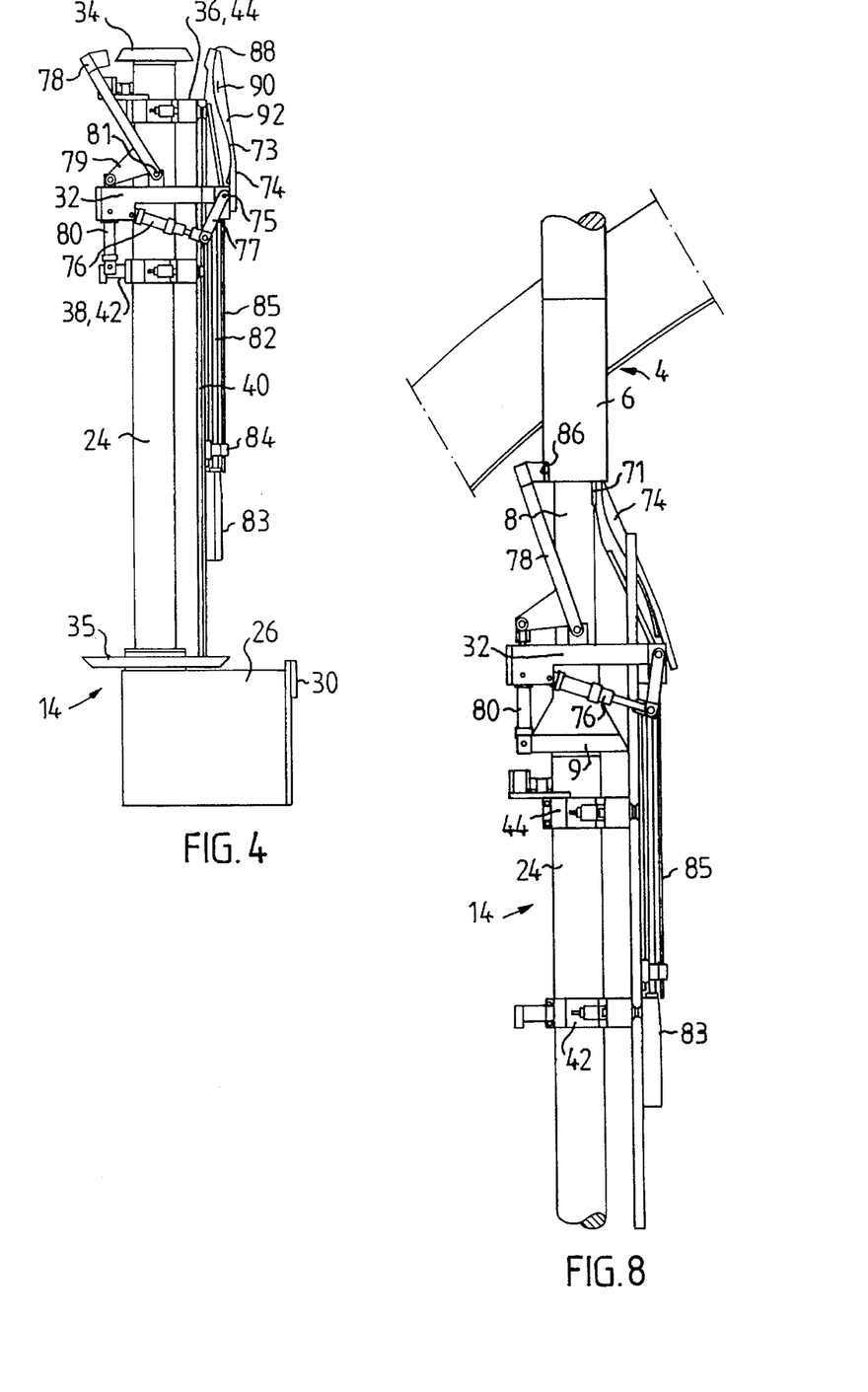

FIG. 4 shows as an example a sketch of a preferred embodiment of the inventive testing arrangement 14. The testing arrangement 14 is characterized in that it comprises a pinching arrangement 32, by means of which a pinching force may be applied between the outer surface of the tube 6 and the outer surface of the projecting part of the sleeve 8 in order to widen the sleeve gap 20 at one side (cf FIG. 2), a sword-guiding arrangement cooperating with a pinching arrangement to guide the sword into the widened part of the gap, a first lifting arrangement for bringing the pinching arrangement on a level with the lower part of the outer tube, a second lifting arrangement for inserting the sword into the gap and a turning arrangement for, in cooperation with the pinching arrangement, displacing the widened part of the gap along the inner periphery of the first tube, whereby the testing arrangement is attachable to said manipulator, and the testing arrangement is dockable at a chosen lead-through by means of the manipulator, whereby the lifting arrangements are arranged at the turning arrangement and whereby the pinching arrangement is arranged at the first lifting arrangement, and a sword-guiding arrangement carrying the sword is arranged at the second lifting arrangement, both lifting arrangements being linearly movable in the axial direction of the tubes.

The first lifting arrangement of the testing arrangement 14 comprising a central structure 24 which is rotatably attached to a frame 26. The frame 26 comprising a turning arrangement comprising a rotational driving unit (not shown) for the central structure 24 and a connection means (not shown) for the connection of control systems which will be further described below. A manipulator tool interface 30 is attached to the frame 26, in this embodiment a so-called dovetail, intended to be connected to a corresponding means at the manipulator.

At the upper end of the central structure 24, there is a frustrum of a cone, hereinafter called docking cone 34, which fits against the sleeve funnel 9 and serves as a geometrically locking docking means at the docking of the testing arrangement 14 to a cap lead-through 4. At the top of the central structure 24 there is arranged a camera, a lighting means and an aiming means (not shown) for visual support by the maneuvering of the docking. A safe centering of the central structure 24 in relation to the axis of the lead-through 4 can be executed by means of the aiming arrangement. A fluid-collecting vessel 35 is arranged at the lower part of the central structure 24 for collecting fluid, which during use of the testing arrangement flows down the central structure 24 originating from an accumulation of fluid in a lead-through 4, from cleaning of the sleeve gap and from contract medium in connection with ultrasonic testing.

The pinching arrangement is built up around the central structure 24, which pinching arrangement is mobile in the vertical direction and is, in its entirety, designated 32. The pinching arrangement 32 is detachably attached to the central structure 24 by means of an associated upper fastening means 36 and an associated lower fastening means 38. The first lifting arrangement comprises a beam which is vertically displaceable along the central structure 24, here called vertical beam 40, by means of which the pinching arrangement 32, in its entirety, is displaceable in the vertical direction. The vertical beam is maneuvered in the vertical direction by means of a vertical beam driving unit 42 and a vertical beam brake 44, whereby the vertical beam driving unit 42 is comprised in the lower fastening means 38 and the vertical beam brake 44 is comprised in the upper fastening means 36.

Figure 5:
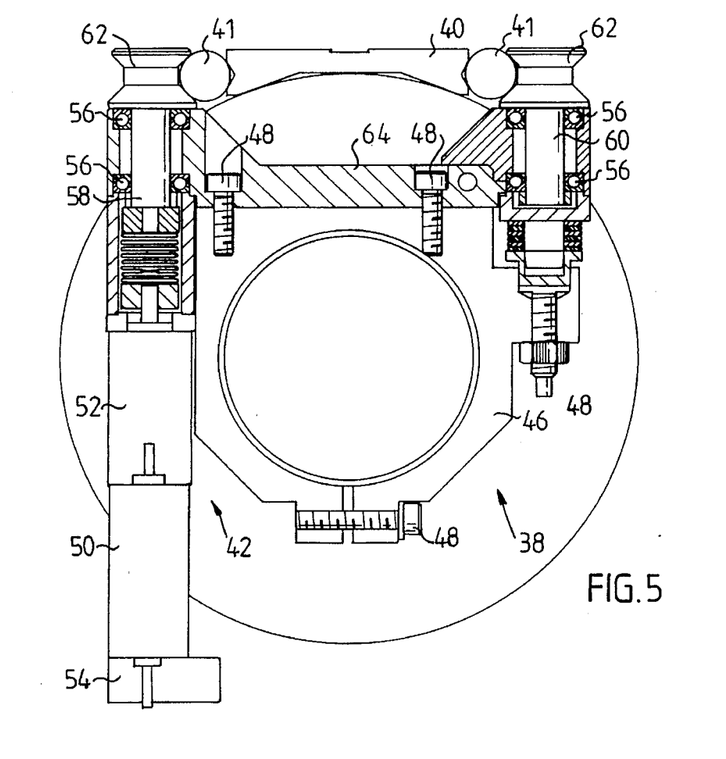
Figure 5A:
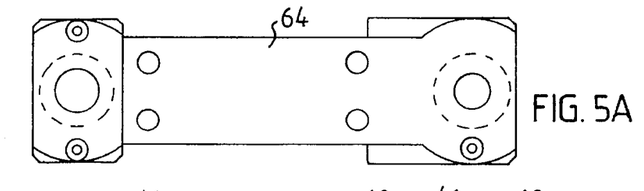

FIG. 5 shows a cross-section of the lower fastening means 38, comprising a remote controllable vertical beam driving unit 42, with which a vertical beam 40 is connected locked by virtue of force and geometry via two vertical bars 41. The vertical bars 41 are attached to and runs along the sides of the beam 40. In the present embodiment, the bars are attached to the beam by bolts. The lower fastening means 38 comprises a clamping means 46 for, by means of at least one bolt 48, a detachable fastening of the fastening means with the vertical beam driving unit at the central structure 24. The vertical beam driving unit 42 is connected to the clamping means by means of at least another bolt 48 and comprises a remote controllable electric motor, a gear 52, a position sensor 54, two, by virtue of bearings 56 rotationally journalled, transverse shafts 58 and 60, whereof one shaft 58 has a power transmitting connection with a motor 50, and thus serves as a driving shaft for the vertical beam 40. The two shafts are hereinafter call transverse driving shaft 58 and transverse support shaft 60. A groove wheel 62 is arranged at each, from the central structure 24 turned, end of the transverse shafts 58,60, which grooves are partly wedge-shaped. The vertical beam 40 presents a prismatic cross-section, the short sides of which also presents wedge-shaped grooves. The mentioned vertical bars 41 are arranged between each groove wheel 62 and the respective short side of the vertical beam 40. In order to displace the vertical beam 40 and the vertical bars 41, a rotational movement of the groove wheels 62 is converted to a linear movement by virtue of the friction between the wheels and the bars. The upper part of FIG. 5 shows a shaft suspension means 64 comprised in vertical beam driving unit. The shaft suspension means 64 is shown from its, towards the central structure 24 turned, side, at the side of the central structure 24 which is closest to the vertical beam.

Figure 6:
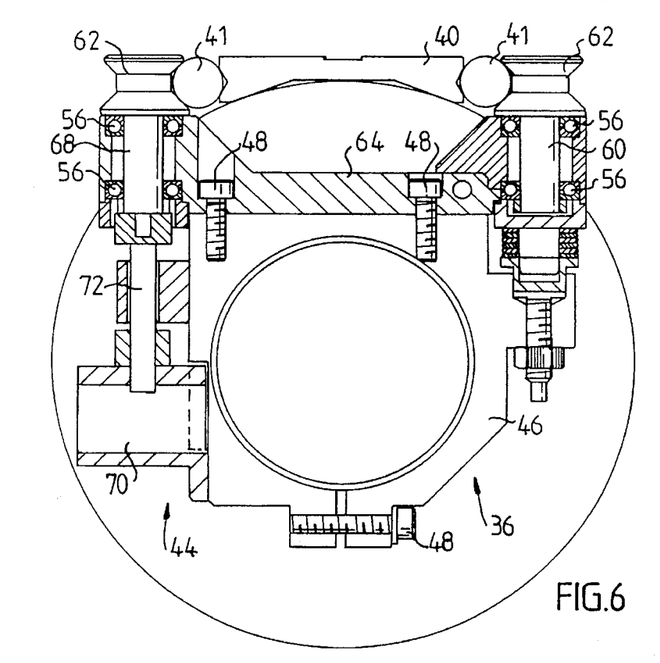
Figure 6A:
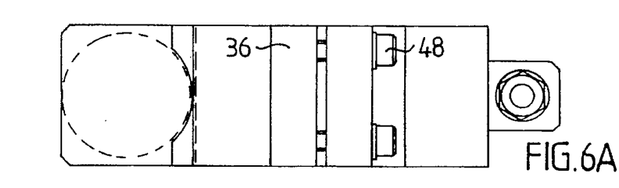

FIG. 6 shows in the same way as FIG. 5 a cross-section of the upper fastening means 36, comprising a vertical beam brake arrangement 44 by virtue of which said vertical beam 40, in the same way as by the vertical beam driving unit 42, is connected via the vertical bars 41 locked by virtue of force and geometry. The upper fastening means 36 is assembled according to the same principles as the above described lower fastening means 38, but presents a remote controllable brake 70 instead of a driving motor, which brake brakes the rotational movement of the transverse support shaft 68 via an intermediate brake shaft 72. The linear movement of the vertical beam 40 can thus be stopped or prevented by means of the brake 70. The means that are similar or corresponding in FIGS. 5 and 6, are indicated with the same reference numerals. The upper part of FIG. 6 shows a lateral view of the upper fastening means 36 from the side which is turned away from the central structure 24, at the side of the central structure which is situated opposite the side of the vertical beam.

Again referring the FIG. 4, the pinching arrangement 32 comprises, as mentioned above, the vertical beam 40 with associated vertical bars. The sword-guiding arrangement cooperating with the pinching arrangement comprises a sword guide 74 arranged at the vertical beam 40, which by means of at least one linearly displacing sword guide maneuvering means 76 and a sword guide arm 77 is maneuverably pivotable around a sword guide shaft 75. The vertical beam presents at its top an upwardly open aperture which allows the sword guide 74 to be turned in towards the central structure 24 between the short sides of the vertical beam 40. The reason for this arrangement is to make it possible to place the upper bearing of the vertical beam, via the groove wheels, as high up the central structure 24 as possible. An essentially S-shaped guide slit 73 runs through the sword guide 74 and debouches at the top of the sword guide. The mentioned guide slit 73 has in the present embodiment an essentially rectangular cross-section which gives the sword a certain allowance in the cross-section. A pinching arm 78 is arranged at the pinching arrangement 32 at the opposite side of the central structure 24 across the sword guide 74. The pinching arm 78 is maneuverably pivotable around a pinching arm shaft 81 by means of at least one linearly displacing pinch maneuvering means 80 and an arm 79. In the preferred embodiment of the invention the linearly displacing maneuvering means 76,80 are constituted by pneumatic cylinders. In the present embodiment the pinching arrangement 32 is designed essentially symmetrically with a collar surrounding the central structure 24 and the linear displacement means 76,80 fastened with a collar on each side of the central structure 24. A probe sword driving unit 83 is arranged along the vertical axis at the vertical beam 40 of the lifting arrangement, at which probe sword driving unit 83 a probe sword 85 is detachable arranged. The probe sword 85 is at its uppermost part slidably inserted in the sword guide 34. The probe sword 85 is maneuverably mobile by means of the probe sword driving unit 83 in the vertical direction, whereby the sword is guided by the sword guide 74. The movement of the probe sword 85 is achieved by means of an electric motor (not shown), comprised in the probe sword driving unit 83, and a lead-screw 82 with a cooperating lead-screw nut 84, at which nut the probe sword is attached.

A fluid section muzzle 88 is arranged at the top of the sword guide 74 for evacuation of fluid and dirt originating from the cleaning of the sleeve gap or from contact medium at ultrasonic testing. The evacuated material is brought along the vertical beam via a conduit to a separate collecting vessel. Furthermore, a verifying means 90 is arranged at the sword guide 74 for verification of the function of the testing probe being arranged at the top of the probe sword 85. In the present case, the verifying means 90 is designed as a piece of metal, which serves as a remote boundary surface when controlling an ultrasonic probe. A monitoring camera 92 is arranged at the pinching arrangement 72 for monitoring the movements of the pinching arm 78, the sword guide 74 and the probe sword 85 at the docking and the testing movement after the docking.

Figure 7:
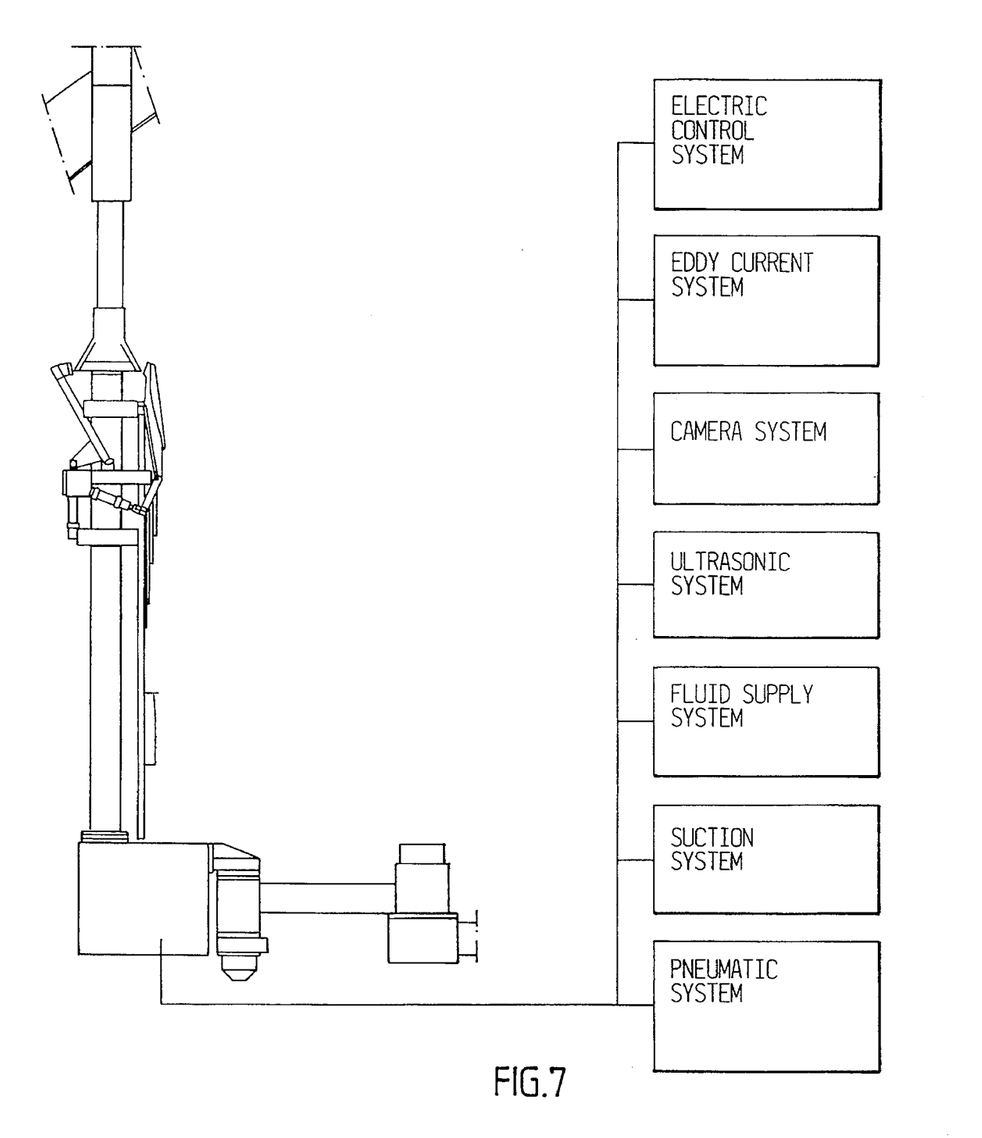

The movements of the testing arrangement 14 at docking and testing will now be explained in more detail with the aid of FIGS. 1, 7 and 8. FIG. 7 shows the testing arrangement 14 in a position docked to a lead-through 4. In FIG. 7 is also explanatory shown peripheral systems associated to the testing arrangement. FIG. 8 shows the upper part of the testing arrangement docked to a cap lead-through 4 and with the pinching arm 78 and the sword guide 74 of the pinching arrangement 32 in a position suitable for insertion of the probe sword 85 into the sleeve gap. In FIG. 1 the central structure 24 of the testing arrangement 14 is positioned essentially coaxially below a lead-through 4, to which position the testing arrangement has been maneuvered by means of the manipulator 10. With the aid of said camera and said aiming arrangement, which are arranged at the top of the central structure, the testing arrangement 14 is maneuvered with precision by means of the manipulator 10 to the docked position shown in FIG. 7, at which position the docking cone of the testing arrangement is connected, locked by virtue of geometry, to the sleeve funnel 9 of the cap lead-through. The sleeve 8, which thus is docked to the testing arrangement 14 is then slightly elevated in order to increase its lateral mobility. Thereafter, see FIG. 8, the pinching arrangement 32 is elevated by means of the vertical beam driving unit 42 past the sleeve funnel 9. When the top of the sword guide 74 has passed the sleeve funnel 9, the upper part of the sword guide 74 is led by means of the sword guide actuating means 76 towards the sleeve so that a sleeve contracting surface 71 arranged at said upper part is in close contact with the sleeve 8. The pinching arrangement 32 is elevated further until the top of the sword guide 60 contacts or is close to the lower end surface of the tube 6. The limit position is indicated by a limit switch, for example an inductive sensor, comprised in the top of the sword guide. Thereafter, the upper part of the pinching arm 78 is led towards the tube by means of the pinch-actuating means 80 so that a pinching surface 86 of the last mentioned upper part is in close contact with the outside surface of the tube 6. The sleeve 8 is now pressed out, by means of the pinching arm 78, the sword guide 74 and the actuating means 76,80, against the side of the tube 6, where the pinching arm is applied, in order to widen the sleeve gap before the insertion of the probe sword. There is in the sleeve 8 and in the manipulator with the attached testing arrangement a compliance that allows a deflection of the end of the sleeve and the end of the testing arrangement that are docked to each other, the deflection being of the magnitude of the few millimeters. The probe sword can now, via the sword guide 74, be inserted vertically into the widened sleeve gap by means of the sword driving unit 83 and be maneuvered by means of said driving unit over the height of the defined testing area. In order to lead the probe over the above described entire testing area, along the inside surface of the tube, the central structure 24 is turned with the thereto non-rotatingly mounted pinching arrangement 32 by means of the rotation driving unit comprised in the frame 26. The movements are sequency-controlled and are controlled step by step by means of signals from limit switches arranged in said testing arrangement.

Figure 9A:
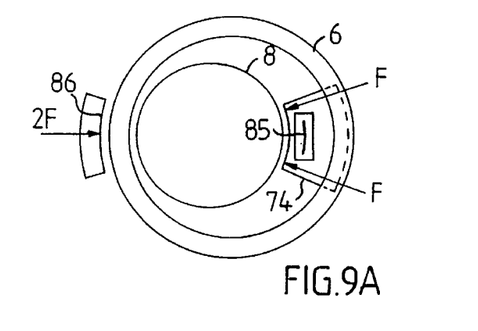
Figure 9B:
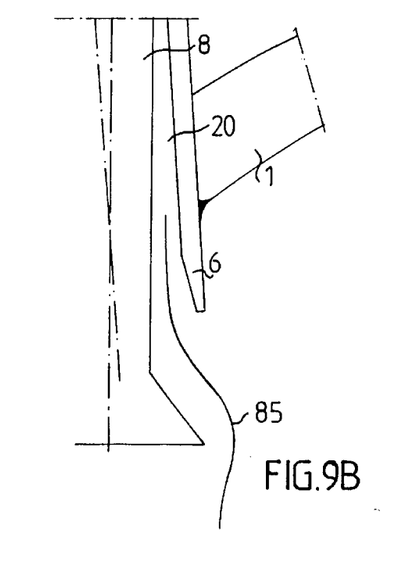

FIG. 9a shows an explanatory cross-section of a lead-through after the deflection of the sleeve 8 towards the inner wall of the tube 6. The pinching surface 86, the probe sword 85 and the top of the sword guide 74 are schematically shown in the figure. Pinching forces are drawn as arrows and are designated with an F. As the central structure 24 with the pinching arrangement 32 rotates, the pinching surface 86 slides relative to the outer surface of the sleeve and the sleeve contacting surface 71 of the sword guide slides relative to the outside surface of the sleeve, while the engagement of the docking cone with the sleeve funnel is maintained. In FIG. 9b it is explanatory shown how the probe sword 85 in the inserted position acquires an essentially S-shaped bending due to the forced curvatures.

Further, peripheral support systems for control, schematically shown in FIG. 7, are associated with the testing arrangement. The following systems are, in the present example, connected to the testing arrangement: a control system for controlling the movements of the testing arrangement, an eddy current measurement system, a camera system for monitoring the movements of the testing arrangement, an ultrasonic system for determination of defects, a fluid-supplying system for supplying the sword with cleaning fluid and a contact medium, and a pneumatic system for actuating the pneumatic means comprised in the embodiment.

PROBE SWORD

The purpose of the inventive probe sword is, in accordance with the above description, to insert it in a gap between two concentric tubes and to displace it in the axial direction of the tubes as well as in a circular movement around an axis of symmetry. The probe sword is characterized in that it comprises a probe end, an elastic swordblade with a bent cross-section adapted to the shape of the gap, a connection means at the end opposite the probe end and a probe attached at the probe end, whereby the sword comprises at least one conduit, running along one edge of the sword, for conveyance of a fluid onto the probe end, and possibly at least one electric wire, running in the same way as the conduit, for the connection of the probe, and whereby the connection means serves for attachment at the sword-actuating means and for connection of an inlet conduit for fluid and of an elctric wire.

Figure 10:
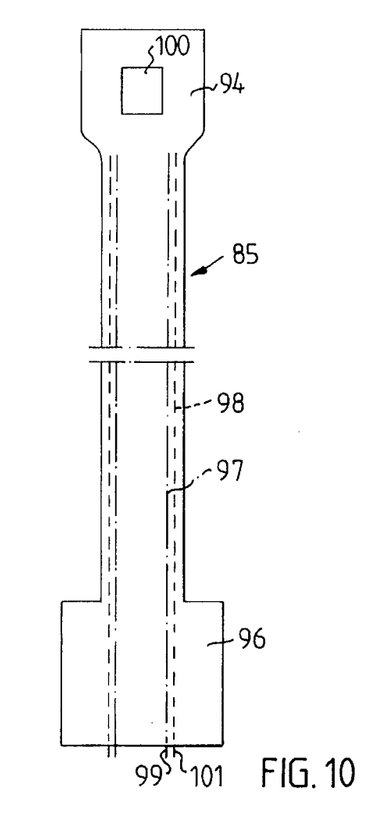

In FIG. 10 is shown an explanatory sketch of an inventive probe sword 85 comprising a sword head 94, adapted for a recessed attachment of a probe 100, and a connection means 96. The probe sword 85 comprises at least one electric wire 97 and at least one fluid conduit 98, which are running in the sword blade along its edges from the connection means 96 to the sword head 94. The electric wire 97 is provided for possible power supply to and for transmitting measuring signals from the probe 100, while the fluid conduit 98 is provided for possible conveyance of fluid to said probe. The connection means 96 at the lower end of the sword comprises at least one electric connection 99 and at least one fluid conduit connection 101. The connection means 96 also comprises a means for fastening the sword at the lead-screw nut of the probe sword driving unit 83.

Figure 11:
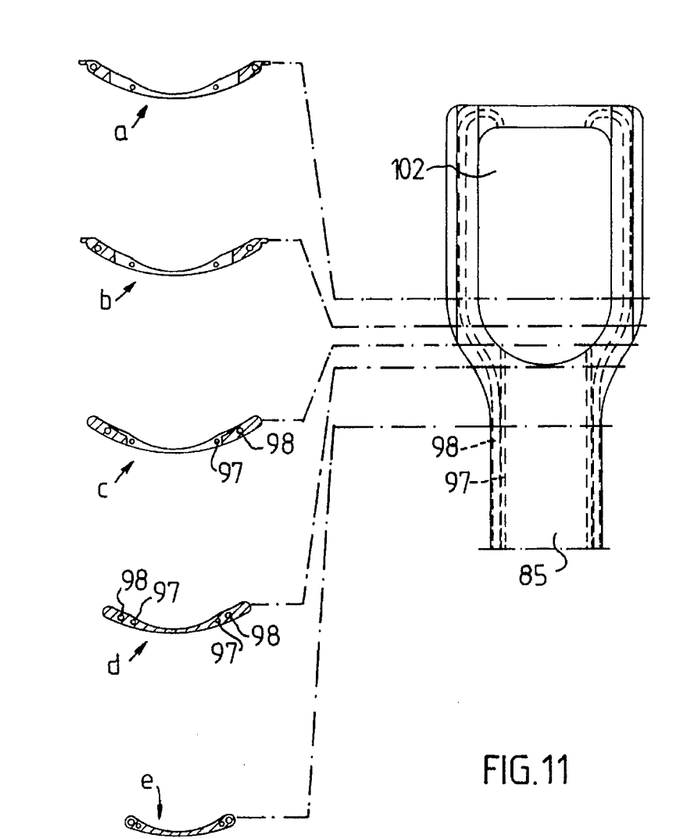

FIG. 11 shows, as an example, the upper part of a probe sword 85 together with cross-sections a, b, c, d and e from indicated parts of the sword. The sword head presents a through-aperture 102, which is provided for recessed mounting of a probe. The cross-sections a–e shows the curvature of the sword, whereby the curvature of the outer contour is adapted to the curvature of the inner surface of the outer tube 6, while the inner radius of the sword is determined by tensile property conditions. The essentially S-shaped curve, shown in FIG. 9b, described by the sword in a position inserted into the gap puts high demands on the resiliency of the sword in two directions. Likewise, the movement of the sword around the gap puts high demands on the stiffness of the sword in one of its transverse directions. During displacement through the sword guide, parts of the sword are successively subject to flexural stress, where the cross-section of the sword takes an essentially plane shape and resumes its curved shape in the sleeve gap. In order to stand up to the stress at the flexing of the sword, the cross-section is thin in the middle, while it has a thicker cross-section along the edges in order to attain a high moment of inertia against bending in the transverse direction of the sword and in order to contain said conduits and wires.

Electric wires 97 and fluid conduits 98 are visible at the edges of the sword. Electrid wires and fluid conduits are, in the present embodiment recessed side by side at the two edges of the sword.

It is clear from FIG. 11 how the electric wires 97 protrudes out of the sword at the lower edge of the recess 102, and from there they can be connected to a probe arranged at the recess. In the preferred embodiment the electric wires are realized in the form of coaxial cables.

The fluid conduits are running in the sword head along the edges of the recess and debouches after a bend of 180° downwards at the upper edge of the recess. In this way, fluid can be fed to and be flushed over the attached probe.

In order to fulfill the demands for strength and to be able to integrate said conduits and wires with the sword, the material is important. In one embodiment, the sword is realized in carbon fiber-reinforced plastic material. In the preferred embodiment, however, the sword is reinforced with Kevlar® and the plastic material may be an isoester.

Figure 12A:
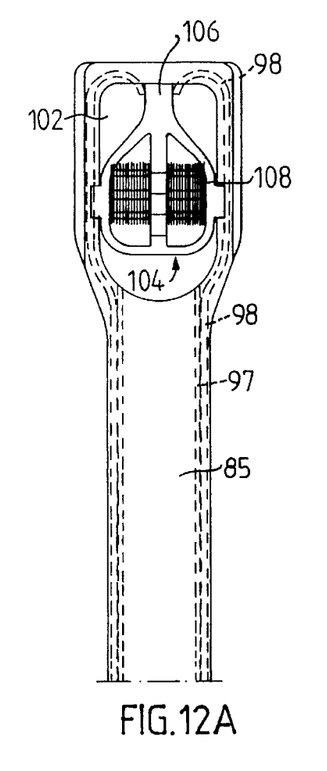
Figure 12B:
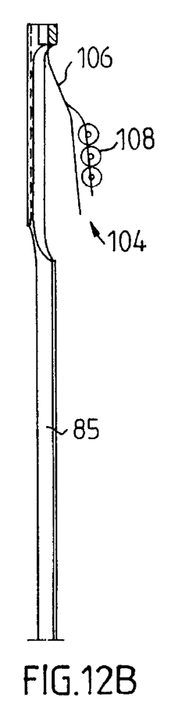

FIGS. 12a and 12b show, from the front and from the side, respectively, the upper part of an inventive probe sword 85 with a cleaning probe 104 for cleaning the sleeve gap attached at the sword head. The cleaning probe 104 is fastened to a resilient holder 106, which at one end in its turn is fastened to the sword. One or more brushes 108 are comprised in the cleaning probe. In the course of cleaning, the cleaning probe is led around in the sleeve gap, and cleaning fluid is fed via the fluid conduit 98 and is flushed over the brushes.

Figure 13A:
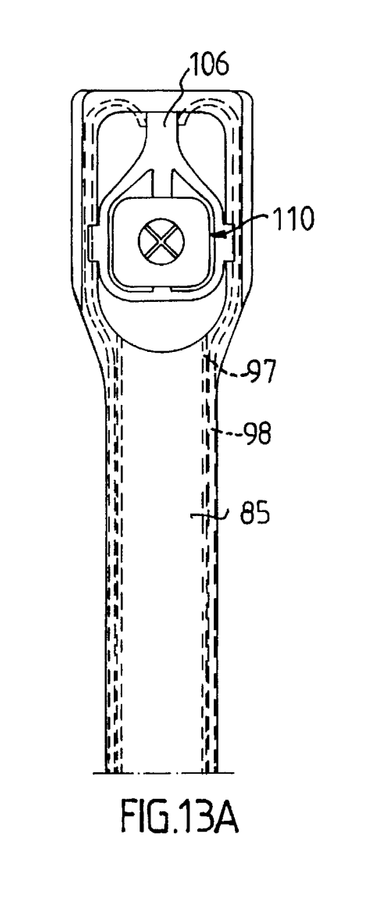
Figure 13B:
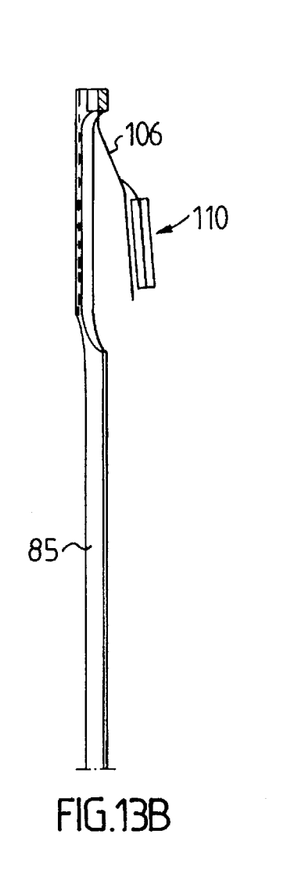

FIGS. 13a and 13b show in the same way a probe sword 85 with an eddy current probe 110 for eddy current testing at the testing area in the sleeve gap. The eddy current probe 110 is likewise fastened to a resilient holder 106, which is fastened to the sword, and is (not shown) connected to the electric wire 97.

Figure 14A:
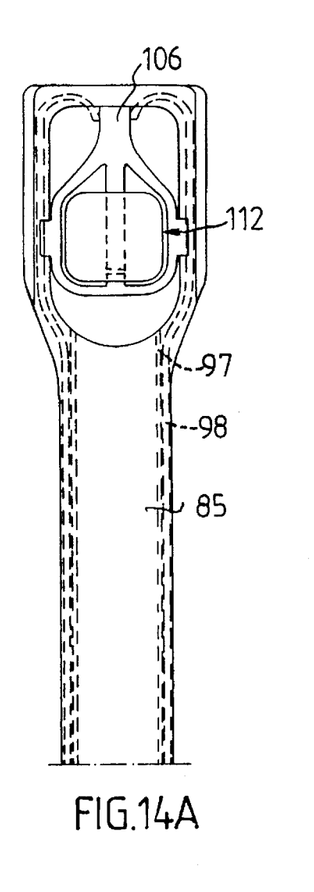
Figure 14B:
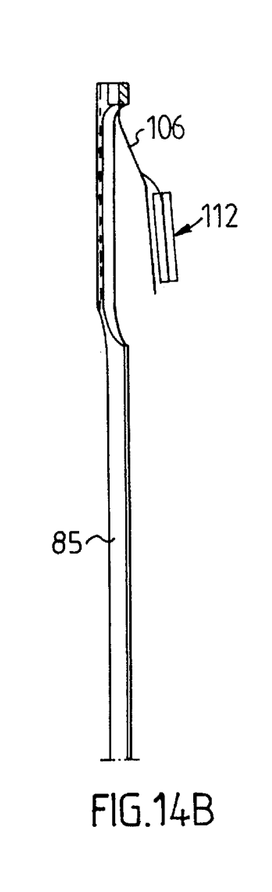

FIGS. 14a and 14 b show in the same way as the preceding FIGS. 12–13, a probe sword 85 with an ultrasonic probe 112 for ultrasonic testing at the testing area in the sleeve gap. The ultrasonic probe is, as the above mentioned probes, fastened to a resilient holder 106 and is (not shown) connected to the electric wire 97. In the ultrasonic testing, at the frequencies at issue, a contact medium is needed. Water is preferably used as contact medium in the ultrasonic testing described in the present text. The contact medium is, during the testing, flushed over the ultrasonic probe via the fluid conduit 98.

The fluid flushed out during the cleaning and the ultrasonic testing is, if it is a liquid, sucked in at the suction muzzle which is situated at the upper edge of the sword guide. Fluid or material moving along the side of the testing arrangement is collected in the collecting vessel situated at the frame.

SUMMARY OF A TESTING PROCEDURE

The positions of the lead-throughs are determined before the testing by means of a camera and the present manipulator. The testing arrangement, equipped with a cleaning sword according to the invention, is mounted to the manipulator and is placed in a docking position at a selected lead-through. The testing arrangement is docked to the lead-through with the aid of an aiming arrangement and a camera, whereupon the pinching arrangement and the sword guide arrangement are placed in working position at the lower part of the lead-through tube.

The testing arrangement is thereafter rotated around the lead-through with the sword still withdrawn in order to check that there are no obstacles. The cleaning sword is thereafter inserted in and led around the gap, whereby the testing area is flushed and brushed clean before scanning for cracks. The cleaning procedure is repeated for all lead-throughs, and the cleaning sword is thereafter exchanged against a sword with an ultrasonic probe. Ultrasonic measurement is thereafter executed at all lead-throughs by leading the sword around the testing area defined for each lead-through. In the proposed testing procedure as described above, no eddy current testing is undertaken, but the possibility is provided by virtue of the described probe sword equipped with an eddy current probe.

I claim:

1. Testing arrangement (14) for materials testing at a lead-through (4) in a nuclear reactor, said lead-through (4) comprising a first tube (6) welded into an opening in a reactor cap (1) and a second tube (8) inserted in the first tube (6), whereby the first tube (6) and the second tube (8) are sealingly joined at a common upper end and whereby the second tube (8) projects further under the reactor cap (1) than the first tube (6), said testing arrangement comprising a probe-equipped sword (85) arranged for insertion into an annular gap (20) that is present between both the tubes and for scanning a testing area which extends around said gap, whereby a manipulator (10) is arranged to position the testing arrangement opposite to the lead-through (4), the testing arrangement (14) comprising a pinching arrangement (32), which applies a pinching force between a point at the outer surface of the first tube (6) and an opposite point at the outer surface of a projecting part of the second tube (8), in order to widen the gap (20) at the side of the second tube (8) at which the pinching force is applied, a sword guiding arrangement (74) cooperating with the pinching arrangement (32) to guide the sword (85) into the widened part of the gap (20), a first lifting arrangement (24,40,42,44) for bringing the pinching arrangement on a level with the lower part of the outer tube, a second lifting arrangement (82,83, 84) for inserting the sword (85) into the gap (20), and a turning arrangement for displacing, in cooperation with the pinching arrangement (32), the widened part of the gap along the inner periphery of the first tube (6) and for displacing in connection therewith the sword in the gap through the testing area, wherein the testing arrangement (14) is attachable to the above mentioned manipulator, and wherein the testing arrangement (14) is dockable at a chosen lead-through (4) by means of the manipulator (10), wherein the lifting arrangements are arranged at the turning arrangement and wherein the pinching arrangement (32) is arranged at the first lifting arrangement (24,40,42,44), and the sword guiding arrangement (74) carrying the sword (85) is arranged at the second lifting arrangement (82,83,84), both lifting arrangements being linearly movable in the axial direction of the tubes.

2. Testing arrangement according to claim 1, wherein the sword guiding arrangement (74) is pivotable between a position enabling passage for the sword (85) past an end piece (9) arranged at the lower end of the inner tube (8) and a position above said end section (9), close to or against the outer surface of said inner tube (8).

3. Testing arrangement according to claim 1, wherein the sword guiding arrangement (74) is provided with a detector for detecting, in connection with the lifting movement of the first lifting arrangement, the fact that said sword guiding arrangement is in contact with or is close to contact with the lower part of the first tube (6).

4. Probe sword (85) for insertion into an annular gap (20) between two concentrically arranged tubes (6,8) and for displacement as well in the axial direction of the tubes as around said annular gap (20), wherein the probe sword (85) comprising a probe end, an elastic sword blade with an essentially U-shaped cross section, a connection means (96) at the end opposite to the probe end and a probe (100) mounted at the probe end, the sword further comprising at least one conduit (98), running along an edge of the sword, for conveyance of a fluid to the probe end, and at least one electric wire (97), running along an edge of the sword, for the connection to the probe, and wherein the connection means (96) comprises means for attachment to a sword actuator (82,83,84) and for connection of inlet conduits for fluid and of an electric input wire and/or output wire.

5. Probe sword (85) according to claim 4, wherein the probe (100) is attached to a holder (106) which is attached to the probe end of the sword, the holder (106) being resilient in a transverse direction.

6. Probe sword (85) according to claim 4, wherein said sword is provided with a through aperture in which the probe (100) is mounted.

7. Probe sword (85) according to claim 4, wherein said probe (100) is a cleaning probe (104) comprising at least one brush (108), adapted to clean a gap into which the sword is inserted in cooperation with a fluid being conveyed to the probe end through the mentioned conduit (98).

8. Probe sword (85) according to claim 4, wherein the probe (100) is an electrically actuatable probe for testing.

9. Probe sword (85) according to claim 4, wherein the sword blade on a part of its length has slightly U-shaped cross section with thickened legs and a thin bottom, in order to give a high moment of inertia about the longitudinal plane of symmetry of the sword blade by virtue of the thickened legs as well as to provide a place for said conduit (98) and wire (97), and to provide, by virtue of the thin bottom, a resilient bendability around a center of curvature that is situated on the convex side of the U-shaped cross section.

10. Method for materials testing of a lead-through in a reactor cap, the lead-through having a first tube, the first tube passing through an opening provided in the reactor cap and being joined to the reactor cap by a weld, and a second tube being inserted essentially coaxially in the first tube, the first and the second tube having a substantially annular gap therebetween, comprising the steps of:

applying a first force on a peripheral surface of the first tube and a second force on a peripheral surface of the second tube substantially opposed to the first force, thereby widening a part of the gap;

inserting a probe into a widened part of the gap between the first and the second tubes; and scanning the area within the gap by means of the probe.

11. Method according to claim 10, comprising the steps of:

displacing at least one of the points of application of the forces along the peripheral surface of at least one of the tubes, thereby displacing the widened part of the gap around the approximate axis of symmetry of the lead-through; and displacing the probe with the widened part of the gap around said approximate axis of symmetry of the lead-through.

12. Method according to claim 10, comprising the step of lifting the second tube, thereby increasing its lateral mobility.

13. Method according to claim 10, wherein the probe is applied to a sword which is flexible in a first transverse direction and is stiff in a second transverse direction perpendicular to the first transverse direction.

14. Method according to claim 13, further comprising the step of inserting the probe-equipped sword into the widened part of the gap past an end piece mounted on the second tube, whereby the sword by flexing adapts to the geometry of the first tube and the second tube.

* * * * *

UNITED STATES PATENT AND TRADEMARK OFFICE
CERTIFICATE OF CORRECTION

PATENT NO. : 5,596,612
DATED : January 21, 1997
INVENTOR(S) : Bjorn H. ANDERSSON It is certified that error appears in the above-indentified patent and that said Letters Patent is hereby corrected as shown below:

On the title page, in Item [73], in the name of the assignee, change "Teknishka" to --Tekniska--.

Signed and Sealed this

First Day of April, 1997

*Attest:*

BRUCE LEHMAN

*Attesting Officer*  *Commissioner of Patents and Trademarks*